United States Patent [19]
Turner

[11] Patent Number: 5,347,718
[45] Date of Patent: Sep. 20, 1994

[54] FOLDING HANDLE HATCHET

[76] Inventor: Paul J. Turner, P.O. Box 143, Afton, Wyo. 83110

[21] Appl. No.: 78,452

[22] Filed: Jun. 15, 1993

[51] Int. Cl.5 .............................................. B26B 23/00
[52] U.S. Cl. ...................................... 30/122; 30/308.1; 30/309; 30/340
[58] Field of Search ................... 30/308.1, 308.2, 308.3, 30/309, 169, 340, 122, 153, 332, 87; 7/167, 168; 81/177.6

[56] References Cited

U.S. PATENT DOCUMENTS

| | | | |
|---|---|---|---|
| 235,425 | 12/1880 | Gearon | 30/309 |
| 1,220,858 | 3/1917 | Klepsch . | |
| 1,331,204 | 2/1920 | Lay | 7/168 |
| 2,280,463 | 4/1942 | Williamson | 30/153 |
| 2,329,424 | 9/1943 | Steiner | 145/2 |
| 2,989,100 | 6/1961 | Burdis et al. | 30/153 |
| 3,321,783 | 5/1967 | Ivan | 7/8.1 |
| 3,702,501 | 11/1972 | Wood | 30/153 |
| 4,106,539 | 8/1978 | Petrich | 30/308.3 |
| 4,730,393 | 3/1988 | Coburn | 30/153 |

*Primary Examiner*—Eugenia Jones
*Assistant Examiner*—Allan M. Schrock
*Attorney, Agent, or Firm*—Hopkins, French, Crockett, Springer & Hoopes

[57] ABSTRACT

A split folding handle hatchet is disclosed that in a first position can be used as a hatchet and in a second position can be used as an Eskimo ulu-type of scraper. The hatchet shank is securely held by unique raised surfaces on the inside of each handle portion when the handle is gripped by the woodsman.

13 Claims, 4 Drawing Sheets

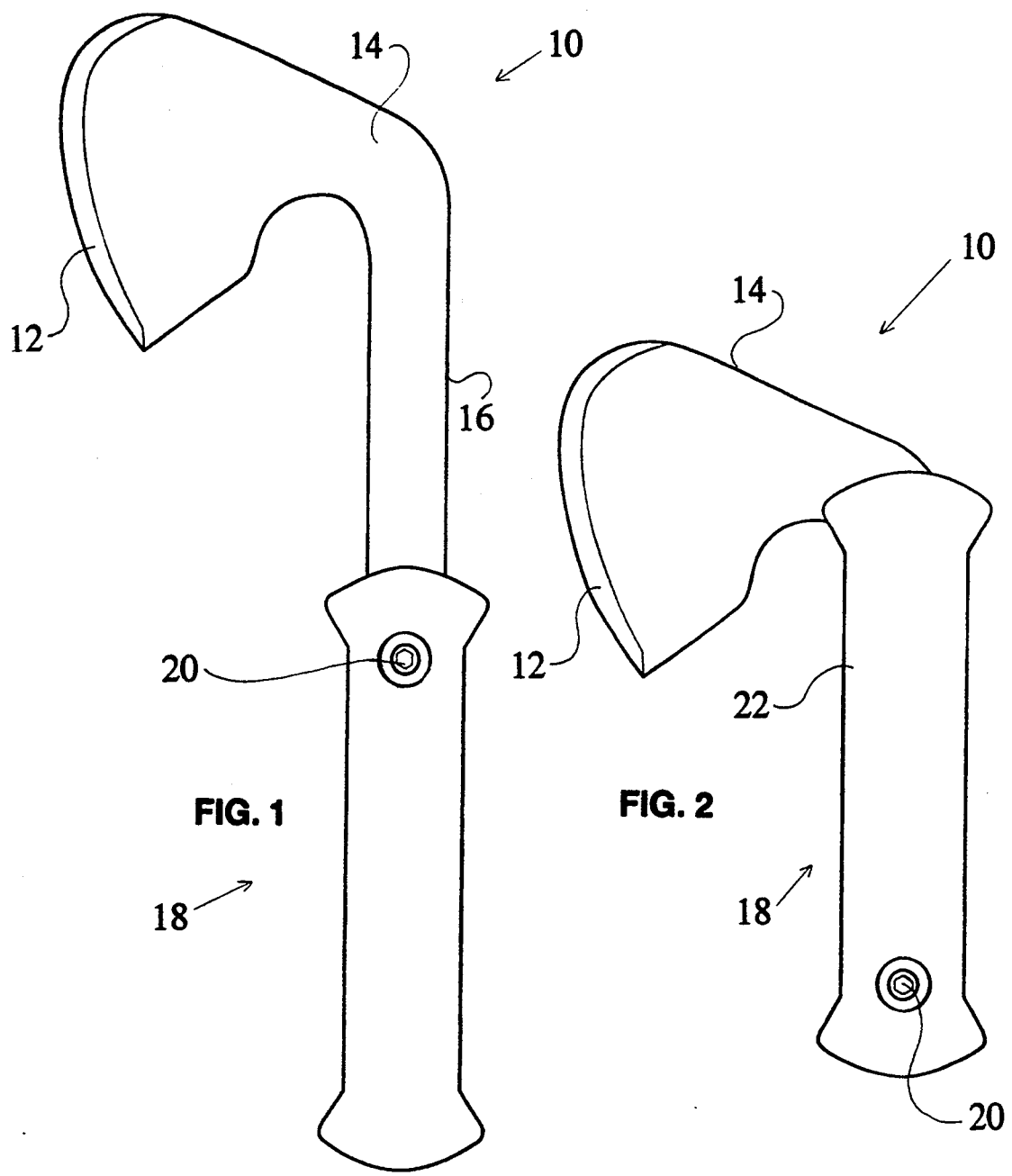

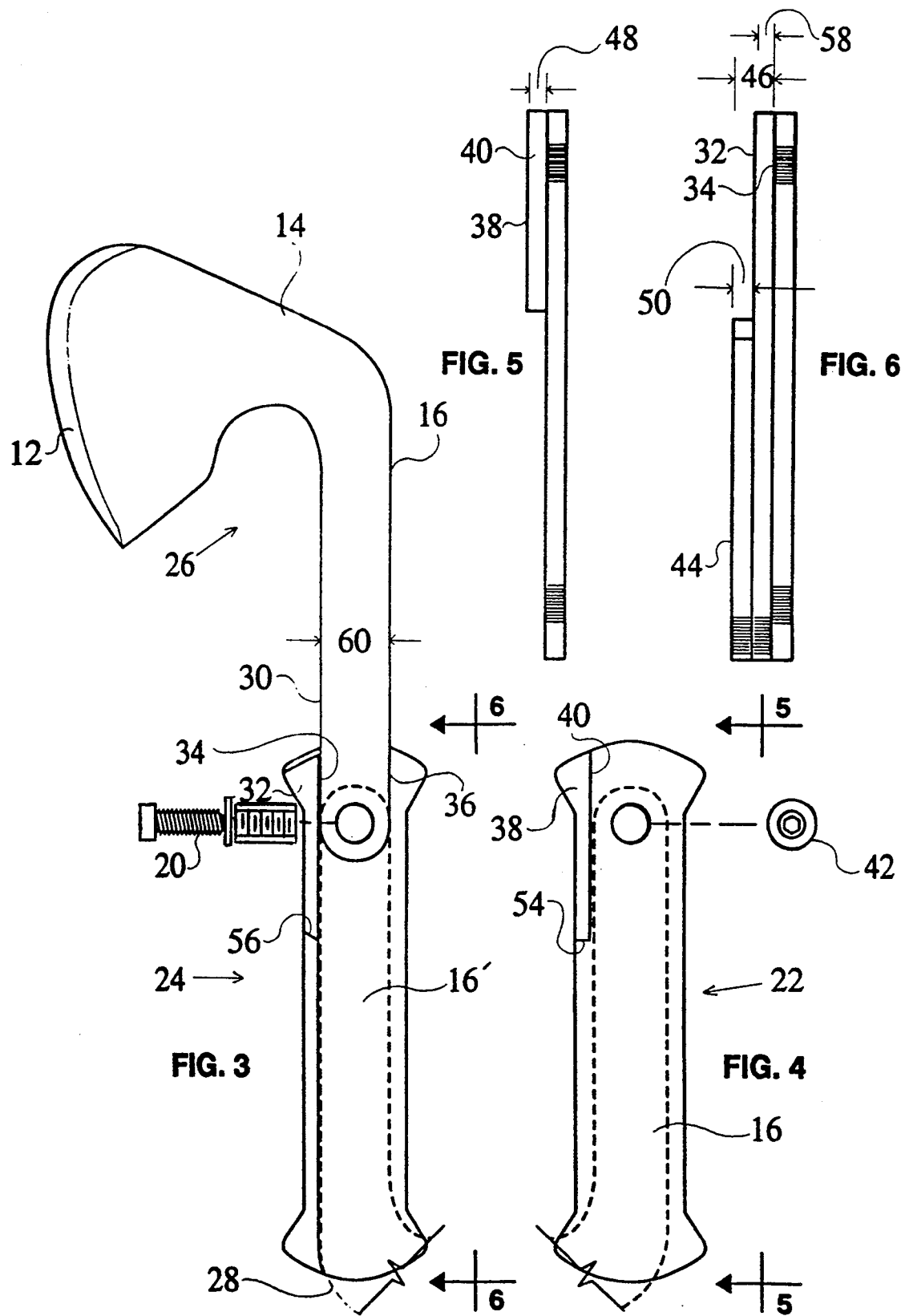

FOLDING HANDLE HATCHET

FIELD OF THE INVENTION

This invention is for a folding handle hatchet that, in a first position, can be operated as a hatchet and, when the two handle portions are folded, it can be operated as an ulu, which is an Eskimo scraping tool for removing the hide from an animal. It is affixed in the two positions by special raised surfaces on the inside of the handle.

BACKGROUND OF THE INVENTION

There are a variety of folding knives and hatchets in the prior art. For instance, U.S. Pat. No. 1,220,858 issued to Klepsch on Mar. 27, 1917, discloses a hatchet that can be folded to engage the cutting blade within the handle to protect the blade. It is maintained in each position by a spring-loaded slide that engages the shank. U.S. Pat. No. 2,329,424 issued to Steiner on Sep. 14, 1943, discloses a similar function folding axe that is bolted in each of the two above positions. U.S. Pat. No. 2,280,463 issued to Williamson on Apr. 21, 1942, discloses a combination knife and axe that has a folding handle that can cover the sharp knife edge. U.S. Pat. No. 3,321,783 issued to Ivan on May 30, 1967, discloses a combination hatchet, hammer, and knife tool that has a rotating hammer and hatchet head that becomes a knife handle when rotated. U.S. Pat. No. 3,702,501 issued to Wood on Nov. 14, 1972, discloses a jack knife that has a pair of handle half-sections that can be split apart and rotated to expose or cover the knife blade.

In none of the above is there a hatchet/ulu combination tool having rotatable handles that restrain the hatchet shank by means of specific raised surfaces on the handle inside surfaces.

SUMMARY OF THE INVENTION

The invention is generally directed to a folding handle hatchet having a hatchet position and an ulu position comprising:
a pair of rotatable handle portions further comprising an obverse handle and a reverse handle pivotally attached by a pivot member; and
a hatchet body connected by the pivot member to the obverse and reverse handles at a pivot end of the hatchet body, the body further comprising a blade and an arcuate head section, connecting the blade to a shank portion;
wherein the shank portion is affixed between the handles in the hatchet position by a raised obverse shank retainer bearing against a trailing shank edge and a reverse shank retainer bearing against a leading shank edge and, wherein rotation of the handles about the pivot member to the ulu position affixes the shank within the handles by a raised reverse ulu shank retainer bearing against the trailing shank edge and the raised obverse shank retainer bears against the leading shank edge. Although this device is described as a folding hatchet, a similar handle arrangement could be used for a jackknife.

Other objects, advantages, and capabilities of the present invention will become more apparent as the description proceeds.

BRIEF DESCRIPTION OF THE DRAWINGS

The invention may be better understood and further advantages and uses thereof may become more readily apparent when considered in view of the following detailed description of the exemplary embodiments, taken with the accompanied drawings, in which:

FIG. 1 is a side elevation of the folding handle hatchet of the present invention in the hatchet position;

FIG. 2 is a side elevation of the hatchet in the ulu position;

FIG. 3 is a side elevation of a hatchet reverse handle with an obverse handle removed;

FIG. 4 is a side elevation of the inside of the obverse handle;

FIG. 5 is an edge view of the hatchet obverse handle taken along lines 5—5 of FIG. 4;

FIG. 6 is an edge view of the hatchet reverse handle;

DETAILED DESCRIPTION OF THE PREFERRED EMBODIMENTS

Figure 7:
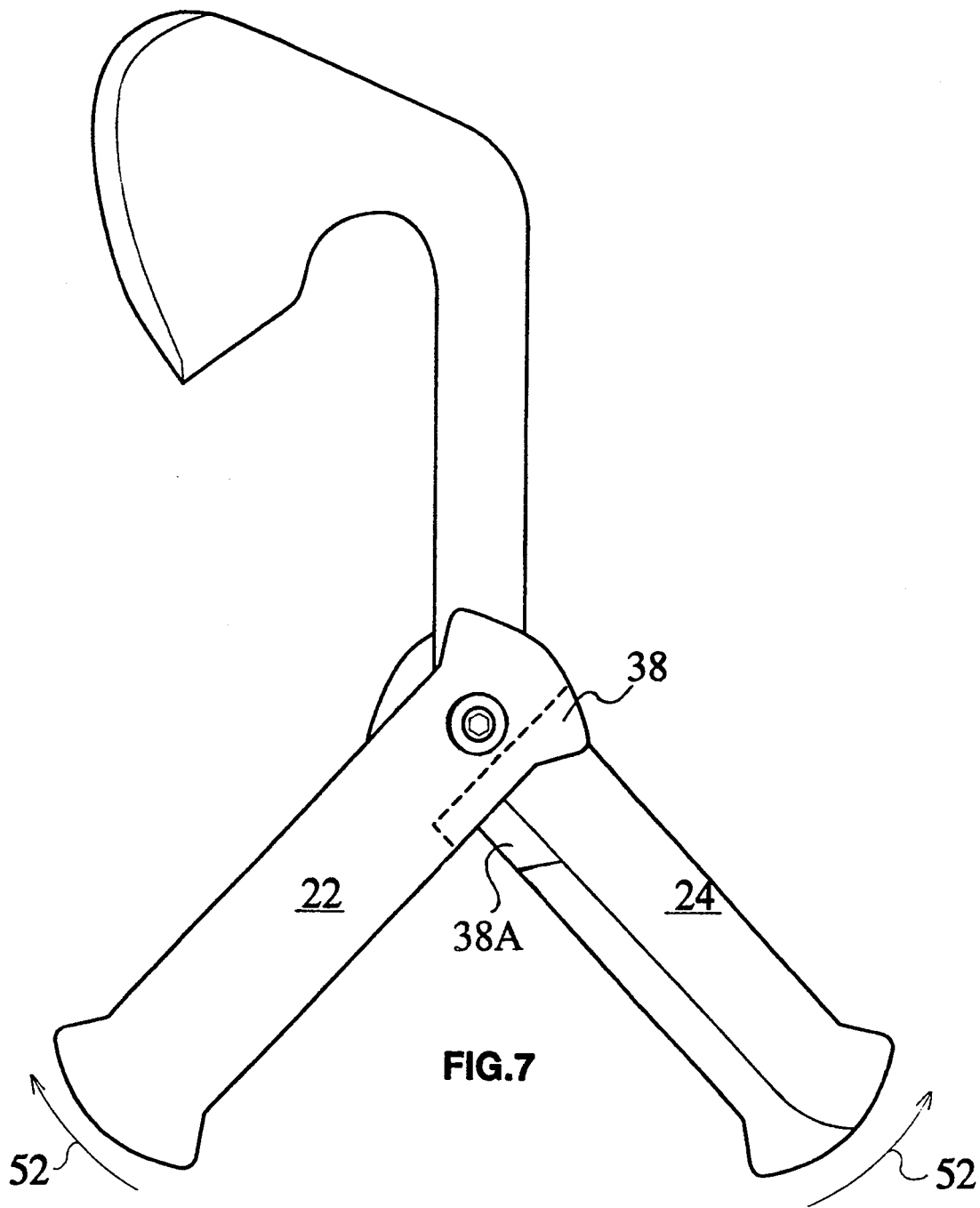
FIG. 7 is a side elevation of the hatchet with each handle portion partially rotated.

Referring to FIG. 1, the folding handle hatchet 10 is shown in a hatchet position and consists of a blade 12, arcuate head 14, shank 16, and handle 18. The handle is affixed to the shank at pivot member 20 which can be any type of fastening means. In this position, the hatchet shank 16 is restrained within the handle by hidden surfaces on the inside of the handle as will be explained later.

FIG. 2 illustrates the folding handle hatchet 10 in an ulu position where the obverse handle 22 and a hidden reverse handle have been rotated to cover the shank and provide for the blade scraper configuration. Again, the shank is restrained within the obverse and reverse handle by surfaces on the inside of each handle.

Referring now to FIG. 3, the inside of reverse handle 24 is visible since the top or obverse handle 22 (FIG. 4) has been removed. In this view (FIG. 3), the solid line hatchet body 26 is shown in the "hatchet" position and in the "ulu" position in phantom lines, with the shank 16' within the handle 24. In the hatchet position 26, a leading edge 30 of the shank 16 bears against a reverse shank retainer 32, thereby preventing counterclockwise movement of the shank 16 relative to the reverse handle 24.

The raised reverse shank retainer face 34 bears against the leading shank edge 30 and can also be seen in the FIG. 6 edge view. In a similar manner, a trailing edge 36 of shank 16 is restrained from clockwise motion (in FIG. 3) by an obverse shank retainer 38 (FIGS. 4 and 5) which has a face 40 that bears against trailing edge 36 when the obverse handle 22 of FIG. 4 is attached to the pivot member 20 and reverse handle 24. The two handles 24 and 22 can be affixed by a nut 42 (FIG. 4) that engages the pivot member 20.

Referring now to FIG. 6, a special feature of the hatchet dimensions is disclosed. In order to rotate the handles, the thickness of the shank 16 must be equal to or slightly more than the combined thickness of the reverse shank retainer 32 and the reverse ulu shank retainer 44, as shown by dimension 46. Another critical dimension is at 48 (FIG. 5). The thickness of the obverse shank retainer 38 must be equal to or less than the clearance dimension at 50 (FIG. 6) above the reverse shank retainer 32, in order to be able to rotate the two handles as at arrows 52 of FIG. 7. FIG. 7 illustrates the handle movement at 52 to close the handles 22 and 24 over the shank 16 for the ulu position, as in FIG. 2. A third critical dimension appears at phantom line 54 on FIG. 7. This bottom edge at 54 of the obverse shank retainer 38 must not extend too far down the handle 22 so as to interfere with the top 56 of the reverse ulu shank retainer 44, as the handles are rotated.

These dimensions become simplified if the shank 16 thickness is twice as thick as the obverse shank retainer thickness 48 (FIG. 5) which is equal to the reverse ulu shank retainer thickness 50, and a reverse shank retainer thickness 58 (FIG. 6). A blade thickness of about ⅛ to ⅜ inch satisfies this requirement where each retainer would then be about ⅛ to 3/16 inch thick, and the handles then rotate easily to the two positions, hatchet 26 and ulu 28. Also, in order that the hatchet blade 12, head 14, and shank 16 be rigidly affixed within handles 22 and 24 in the hatchet position, the shank width 60 must be equal to the clearance between the (FIG. 3) reverse shank retainer face 34 and the obverse shank retainer face 40 (FIG. 4) when in the hatchet position. Other typical dimensions would be a handle width of about 1⅜ inches, a handle length of about 5⅜ inches, and an overall hatchet position length of about 9¾ inches.

Figure 8:
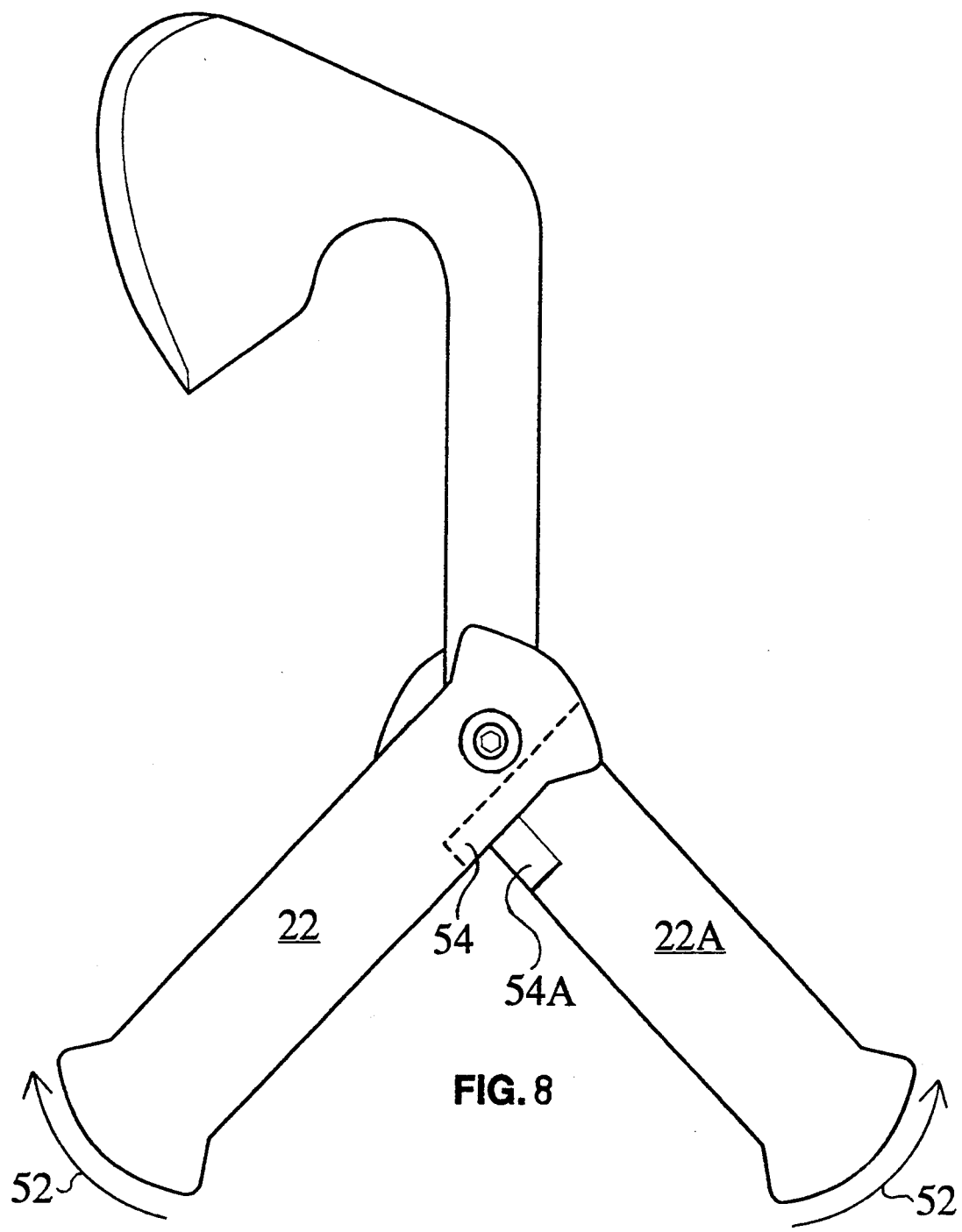
FIG. 8 is a side elevation of a preferred embodiment of the hatchet.

FIG. 8 discloses a preferred embodiment that utilizes a common part 22 and 22A (i.e., the obverse handle of FIGS. 4 and 5) on both sides of the blade 16. In this embodiment, these two parts, 22 and 22A, are exactly the same as can be seen by comparing the shapes of the obverse shank retainer 38 with a similar reverse shank retainer 38A. This makes fabrication simpler by having two of three parts being similar.

Blade and shank materials can be either high carbon steel, chrome resistant (CRES) steel, or titanium. The handles can be a combination of metal, plastic, and/or wood, with the retaining faces being a hard metal, e.g., steel, CRES, or titanium.

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

What is claimed is:

1. A folding handle hatchet having a hatchet position and an ulu position, said hatchet comprising:
   a. a pair of rotatable handle portions further comprising an obverse handle and a reverse handle pivotally attached by a pivot member; and
   b. a hatchet body connected by the pivot member to the obverse and reverse handles at a pivot end of the hatchet body, said body further comprising a blade and an arcuate head section, said arcuate head connecting the blade to a shank portion; wherein the shank portion is affixed between the handles in the hatchet position by an obverse shank retainer handle portion bearing against a trailing shank edge and a reverse shank retainer handle portion bearing against a leading shank edge and, wherein rotation of the handles about the pivot member to the ulu position affixes the shank within the handles by a reverse ulu shank retainer handle portion bearing against the trailing shank edge and the obverse shank retainer handle portion bears against the leading shank edge.

2. The folding handle hatchet as recited in claim 1 wherein the pivot member further comprises a threaded pin restrained by a pair of bolts and washers.

3. The folding handle hatchet as recited in claim 2 wherein the length of the hatchet in the hatchet position is about 10 inches and the length of the hatchet in the ulu position is about 6 inches.

4. The folding handle hatchet as recited in claim 3 wherein the shank is about ¼ to ⅜ inch thick and the combined thickness of the reverse shank retainer handle portion and reverse ulu shank retainer handle portion is about ¼ to ⅜ inch, thereby permitting obverse and reverse handle rotation about the shank.

5. The folding handle hatchet as recited in claim 4 wherein a reverse shank retainer handle portion thickness and an obverse shank retainer handle portion are about ⅛ to 3/16 inch, thereby permitting rotation of the obverse and reverse handles to the ulu position.

6. The folding handle hatchet as recited in claim 1 wherein a width of the shank is equal to the distance between an obverse shank handle portion retainer face and a reverse shank handle portion retainer face in the hatchet position, thereby firmly affixing the shank between the handles in the hatchet position.

7. The folding handle hatchet as recited in claim 6 wherein the distance between a reverse ulu shank retainer handle portion face and the obverse shank retainer handle portion face is equal to the width of the shank, thereby firmly affixing the shank between the handles in the ulu position.

8. A folding handle hatchet having a hatchet position and an ulu position, said hatchet comprising:
   a. a pair of rotatable handle portions further comprising an obverse handle and a reverse handle pivotally attached by a pivot member; and
   b. a hatchet body connected by the pivot member to the obverse and reverse handles at a pivot end of the hatchet body, said body further comprising a blade and an arcuate head section, said arcuate head connecting the blade to a shank portion; wherein the shank portion is affixed between the handles in the hatchet position by an obverse shank retainer handle portion bearing against a trailing shank edge and a similar reverse shank retainer handle portion bearing against a leading shank edge and, wherein rotation of the handles about the pivot member to the ulu position affixes the shank within the handles by the similar reverse shank retainer handle portion bearing against the trailing shank edge and the obverse shank retainer handle portion bears against the leading shank edge.

9. The folding handle hatchet as recited in claim 8 wherein the pivot member further comprises a threaded pin restrained by a pair of bolts and washers.

10. The folding handle hatchet as recited in claim 9 wherein the length of the hatchet in the hatchet position is about 10 inches and the length of the hatchet in the ulu position is about 6 inches.

11. The folding handle hatchet as recited in claim 10 wherein an obverse shank retainer handle portion thickness and a similar reverse shank retainer handle portion thickness is about ⅛ to 3/16 inch, thereby permitting rotation of the obverse and reverse handles to the ulu position.

12. The folding handle hatchet as recited in claim 11 wherein a width of the shank is equal to the distance between an obverse shank handle portion retainer face and a reverse shank handle portion retainer face in the hatchet position, thereby firmly affixing the shank between the handles in the hatchet position.

13. The folding handle hatchet as recited in claim 12 wherein the distance between an obverse shank retainer handle portion face and a similar reverse shank retainer handle portion face is equal to the width of the shank, thereby firmly affixing the shank between the handles in the ulu position.

* * * * *